(12) United States Patent
Oono

(10) Patent No.: US 6,724,531 B2
(45) Date of Patent: Apr. 20, 2004

(54) OPTICAL LOW-PASS FILTER

(75) Inventor: Masahiro Oono, Saitama-ken (JP)

(73) Assignee: PENTAX Corporation, Tokyo (JP)

( * ) Notice: Subject to any disclaimer, the term of this patent is extended or adjusted under 35 U.S.C. 154(b) by 0 days.

(21) Appl. No.: 09/771,581

(22) Filed: Jan. 30, 2001

(65) Prior Publication Data

US 2001/0010594 A1 Aug. 2, 2001

(30) Foreign Application Priority Data

Jan. 31, 2000 (JP) ........................................ 2000-021039

(51) Int. Cl.[7] ................................................ G02B 5/30
(52) U.S. Cl. .................. 359/497; 359/494; 359/495; 359/498; 359/499; 348/273; 348/336; 348/340
(58) Field of Search ................................ 359/495, 494, 359/497–499, 502; 348/273, 336, 340

(56) References Cited

U.S. PATENT DOCUMENTS 4,626,897 A 12/1986 Sato et al.
6,327,085 B1 * 12/2001 Osawa et al. ................ 359/495

FOREIGN PATENT DOCUMENTS

JP 57-15369 3/1982

* cited by examiner

*Primary Examiner*—Audrey Chang
*Assistant Examiner*—Craig Curtis
(74) *Attorney, Agent, or Firm*—Greenblum & Bernstein, P.L.C.

(57) ABSTRACT

An optical low-pass filter used in association with an imaging element which has a plurality of pixels arranged in vertical and horizontal direction with regularity, is provided with first through third birefringent plates arranged in the order from a light incident side. The low-pass filter separates an incident ray into four rays, a separation width of the rays in the vertical direction being $\delta v$, and a separation width of the rays in the horizontal direction being $\delta h$. A separation angles of the first through third birefringent plates are $\theta$, $(\theta - 90°)$ and $0°$, respectively, and separation widths of the first through third birefringent plates are $(\delta v \times \sin \theta)$, $(\delta v \times \cos \theta)$ and $\delta h$, respectively.

36 Claims, 5 Drawing Sheets

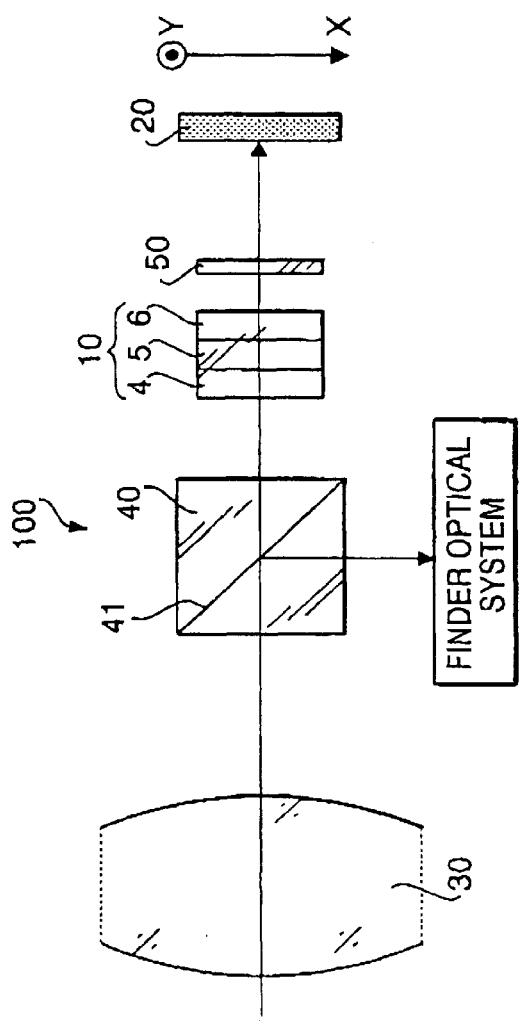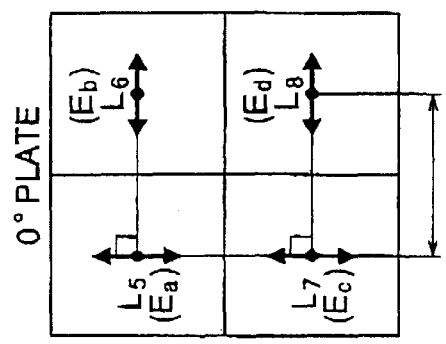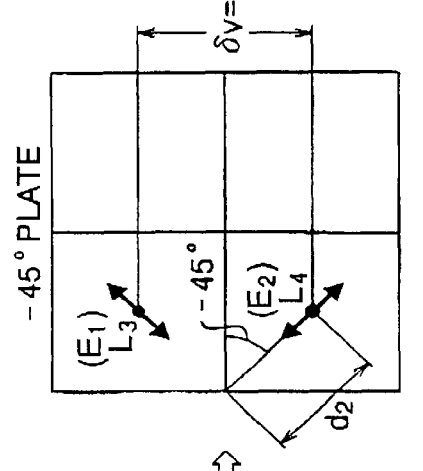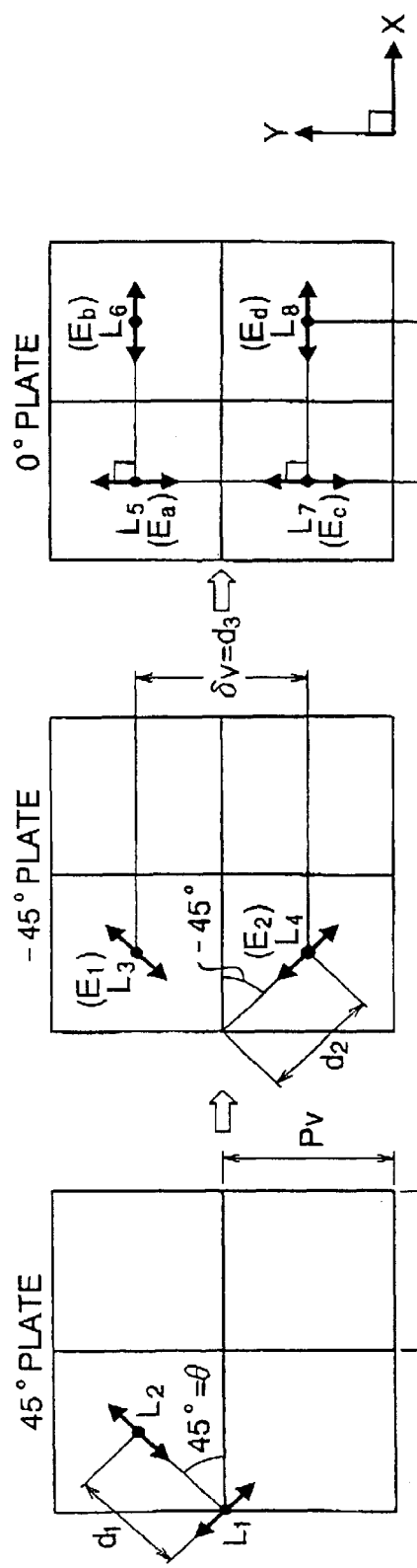
FIG. 1
FIG. 2A FIG. 2B FIG. 2C

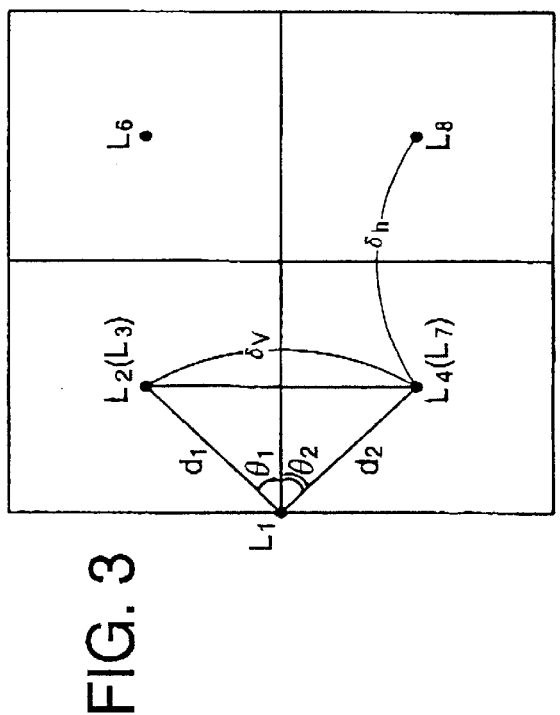
FIG. 3
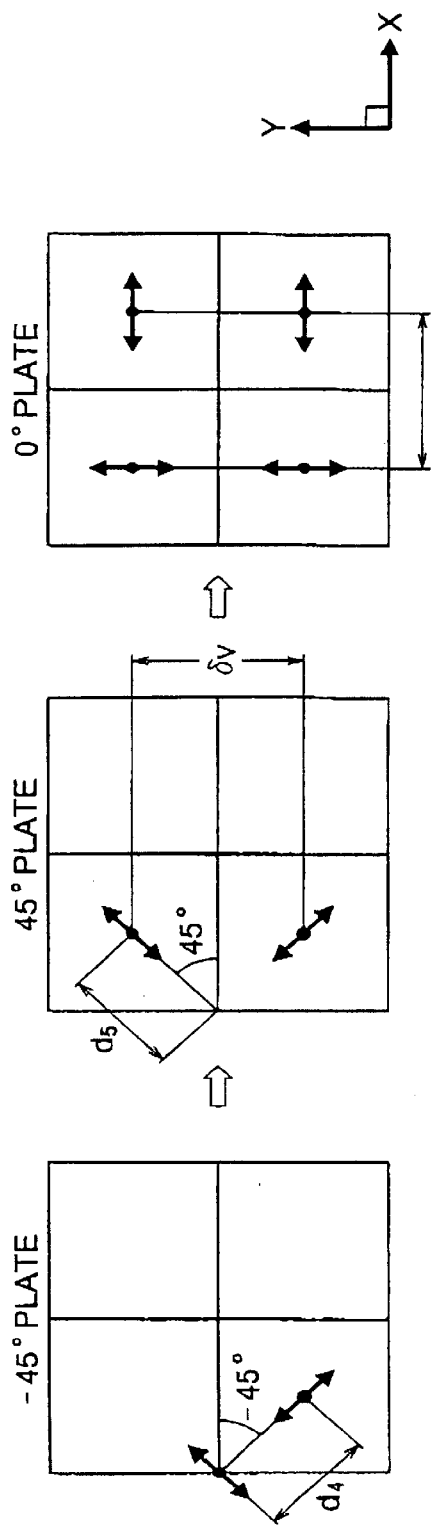
FIG. 4A
FIG. 4B
FIG. 4C

OPTICAL LOW-PASS FILTER

BACKGROUND OF THE INVENTION

The present invention relates to an optical low-pass filter for a digital camera.

Recently, digital cameras have become widely used instead of cameras using silver-salt films. A digital camera is provided with an image capturing element such as a CCD (Charge Coupled Device), which converts an optical image into an electronic image (i.e., electric image signals), and the electronic image is stored in a recording medium, such as a memory or a floppy disk, as image data. If the image capturing element is constructed such that a plurality of pixels are arranged in row and column directions with regularity, the following problem occurs. That is, if a spatial frequency of an optical image formed on the image capturing element is relatively high in comparison with a pitch of the pixels (i.e., a distance between the centers of adjacent pixels), moiré or false color appears in the captured image.

In order to avoid the above problem, conventionally, an optical low-pass filter (LPF) is inserted between an imaging lens and the image capturing element. The LPF removes the high-spatial-frequency components, and only lower-spatial-frequency components, which do not cause the moiré or the like, are incident on the image capturing element.

FIG. 9 shows an example of a conventionally used LPF 10'. The LPF 10' includes, from a photographing lens side (left-hand side in FIG. 9), a horizontally separating birefringent plate 1, a depolarization plate 2 and a vertically separating birefringent plate 3. In FIG. 9, for the sake of clarification in description, the plates 1, 2 and 3 are shown as separated. However, the actual device is constructed such that the three birefringent plates 1, 2 and 3 are integrally formed. That is, the first through third birefringent plates are adhered with each other.

In the following description, it is assumed that the imaging element has a rectangular shape, and a direction parallel to a longer side of a rectangular imaging element will be referred to as a horizontal direction, and a direction parallel to a shorter side of the rectangular imaging element will be referred to as a vertical direction. In FIG. 9, the horizontal direction and the vertical direction are indicated by arrows X and Y, respectively.

In general, a birefringent plate separates an incident ray into an ordinary ray and an extraordinary ray. The ordinary ray and the extraordinary ray are linearly polarized rays, whose oscillating directions (i.e., the polarized directions) are orthogonal to each other. It is known that a separation width, i.e., a distance between the ordinary ray and the extraordinary ray, are proportional to the thickness of the birefringent plate. For example, when the birefringent plate is formed of an artificial crystal plate, the separation width d and the thickness t of the birefringent plate have a relationship expressed by equation (1).

$$d = \frac{n_e^2 - n_o^2}{2n_o n_e} t = 5.9 \times 10^{-3} t \quad (1)$$

where, $n_o$ is a refractive index for the ordinary ray, and $n_e$ represents a refractive index for the extraordinary ray.

In the conventional LPF 10', the incident ray is separated by the horizontally separating birefringent plate 1 at a predetermined separation width in the horizontal direction. The rays emerged from the horizontally separating birefringent plate 1 are depolarized by the depolarization plate 2. Thus, the rays passed through the depolarized plate 2 oscillate similarly to natural light (i.e, unpolarized).

The two rays emerged from the depolarization plate 2 are incident on the vertically separating birefringent plate 3. Then, each ray is separated in the vertical direction by the vertically separating birefringent plate 3. Thus, a ray incident on the LPF 10' is separated into four rays by the LPF 10', and the rays emerged therefrom are incident on the imaging element. With this configuration, an image can be blurred, and the high-spatial-frequency components of the optical image can be removed.

If the ray incident on the LPF 10' is not polarized in a particular direction (i.e., unpolarized), as the rays of the normal light, energies of the rays separated by the LPF 10' and incident on respective pixels of the imaging element are substantially even. Therefore, the high frequency components can be removed evenly in both the horizontal and vertical directions.

Recently, a single lens reflex type digital camera (hereinafter, referred to as an SLR digital camera) has been developed and used widely. In some SLR digital cameras, in order to direct light passed through a photographing lens to the imaging element and a finder optical system, a beam splitter is provided between the photographing lens and the LPF.

Generally, the beam splitter is provided with a light separating coating, and light separated by the beam splitter has a certain polarization characteristics. Accordingly, a ray passed through/reflected by the beam splitter may not be separated evenly by the conventional LPF constructed as above. That is, in general, the energy of the vertically polarized component and the energy of the horizontally polarized component of the beam passed through/reflected by the beam splitter may be different.

If such a beam is incident on the conventional LPF 10', the energies of the rays separated by the LPF 10' may not be even. In a particular case, the energy of one or some of the separated rays may be substantially zero. In such a condition, the blurring effect may be different in the horizontal direction and in the vertical direction. Then, the high-spatial-frequency components may not be removed or suppressed sufficiently depending on the direction, and the false color phenomenon may remain. Therefore, the conventional LPF is not suitable to the SLR digital cameras employing a beam splitter between the photographing lens and the LPF.

SUMMARY OF THE INVENTION

It is therefore an object of the invention to provide an improved LPF (low-pass filter) which is capable of separating incident ray to a plurality of rays having substantially the same energy, even if the incident ray is polarized so that the high-spatial-frequency components of the optical image can be removed.

For the above objects, according to the invention, there is provided an optical low-pass filter used in association with an imaging element which has a plurality of pixels arranged in vertical and horizontal direction with regularity, is provided with first through third birefringent plates arranged in the order from a light incident side. The low-pass filter separates an incident ray into four rays, a separation width of the rays in the vertical direction being δv, and a separation width of the rays in the horizontal direction being δh. The separation angles of the first through third birefringent plates are θ(0–90°) and 0°, respectively, and separation widths of the first through third birefringent plates are (δv×sin θ), (δv×cos θ) and δh, respectively, θ being greater than 0° and less than 90°.

In a particular case in the above configuration, the separation angle θ may be substantially 45 degrees.

Alternatively, the separation angles of the first through third birefringent plates are θ, (θ+90°) and 0°, respectively, and the separation widths of the first through third birefringent plates are |δv×sin θ|, δv×cos θ and δh, respectively, θ being greater than −90° and less than 0°.

In a particular case in the above configuration, the separation angle e may be substantially −45 degrees.

Further alternatively, the separation angles of the first through third birefringent plates, with respect to the horizontal direction, are θ, (θ+90°) and 90°, respectively, and the separation widths of the first through third birefringent plates are (δv×cos θ), (δv×sin θ) and δv, respectively, θ being greater than 0° and less than 90°.

In a particular case in the above configuration, the separation angle θ may be substantially 45 degrees.

Still alternatively, the separation angles of the first through third birefringent plates, with respect to the horizontal direction, are θ, (θ−90°) and 90°, respectively, and the separation widths of the first through third birefringent plates are |δh×cos θ|, (δh×sin θ) and δv, respectively, θ being greater than 90° and less than 180°.

In a particular case in the above configuration, the separation angle θ may be substantially 135 degrees.

Optionally, the ray incident on the first birefringent plate may have different energies in the horizontal direction and in the vertical direction.

Further optionally, the first, second and third birefringent plates may be integrally formed.

Furthermore, at least one of a light incident surface of the first birefringent plate and a light emerging surface of the third birefringent plate may be formed with an infrared cut coating.

Optionally, a dummy glass element may be integrally formed with the integrally formed first, second and third birefringent plates.

In this case, a thickness of said dummy glass element may be adjusted so that the optical low-pass filter has a predetermined thickness regardless of the thickness of each of the first, second and third birefringent plates.

In a particular case, the separation widths δh and δv are substantially the same.

BRIEF DESCRIPTION OF THE ACCOMPANYING DRAWINGS

FIG. 1 shows an arrangement of optical elements of an SLR digital camera according to a first embodiment of the invention;

FIGS. 2A–2C show separation of rays using the LPF shown in FIG. 1;

FIG. 3 is a chart for illustrating the principle of the invention;

FIGS. 4A–4C show separation of rays using the LPF according to a first modification;

Figure 9:
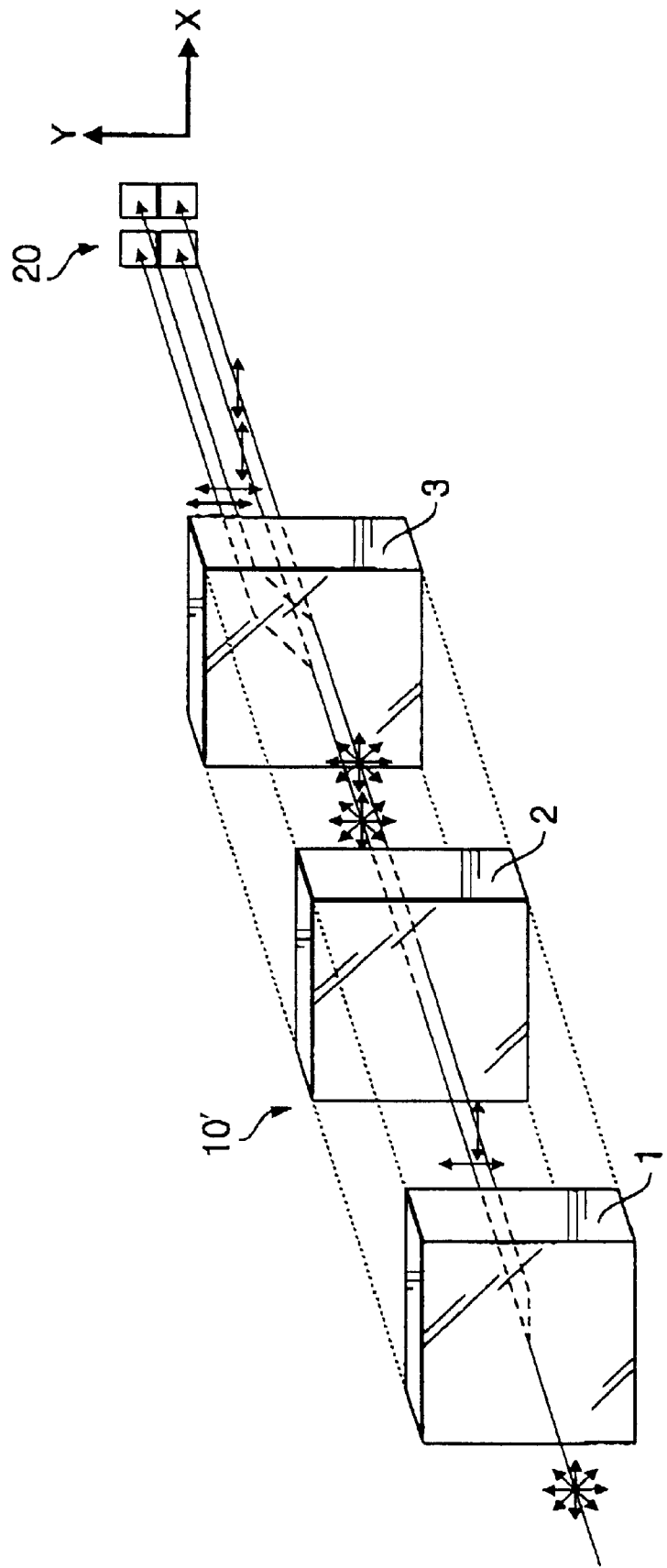

FIG. 9 schematically shows a perspective view of a conventional low-pass filter:

DESCRIPTION OF THE EMBODIMENT

FIG. 1 shows an arrangement of optical elements of an imaging optical system 100, which can be employed in an SLR digital camera, according to a first embodiment of the invention.

The imaging optical system 100 includes, from an object side, a photographing lens group 30, a beam splitter 40, an LPF (low-pass filter) 10, an infrared cut filter 50, and a CCD (Charge Coupled Device) 20. The CCD 20 is configured such that a plurality of image receiving pixels are arranged in matrix, i.e., in a horizontal direction X and in a vertical direction Y, with regularity it should be noted that, as aforementioned, the horizontal direction is indicated by arrow X, and the vertical direction is indicated by arrow Y in the drawings. The LPF 10 includes, from the object side, a first birefringent plate 4, a second birefringent plate 5 and a third birefringent plate 6.

FIGS. 2A–2C shows a relationship between rays separated by the first through third birefringent plates 4, 5 and 6 and a positional relationship thereof with respect to pixels of the CCD 20. Specifically, FIG. 2A shows positions of rays separated by the first birefringent plate 4 with respect to the four adjacent pixels of the CCD 20. In the drawing, rays are indicated by black circles, and four rectangles represent the positions of the pixels of the CCD 20. FIG. 2B shows positions of rays separated by the second birefringent plate 5 with respect to the pixels of the CCD 20, and FIG. 2C shows positions of rays separated by the third birefringent plate 6 with respect to the pixels of the CCD 20. A size of the pixels (i.e., a distance between the centers of the pixels) of the CCD 20 is defined such that a length of a horizontal side of a pixel is Ph, and a length of a vertical side of a pixel is Pv. Therefore, in this embodiment, the pixels are arranged at the pitch of Ph in the horizontal direction, and at the pitch of Pv in the vertical direction. Separation widths of the rays, in order that the rays are incident on respective pixels, are δh in the horizontal direction, and δv in the vertical direction (see FIGS. 2B and 2C). Preferably, δh is substantially equal to Ph, and δv is substantially equal to Pv. Furthermore, in this preferred embodiment, Ph is substantially equal to Pv. Of course, Ph need not be equal to Pv according to the invention.

The first birefringent plate 4 separates an incident ray into an ordinary ray, which passes through the first birefringent plate 4 without changing the position, and an extraordinary ray which is separated from the ordinary ray by a distance d1 (i.e., a separation width) on an X-Y plane, and rotated, with respect to a horizontal direction X, by 45 degrees clockwise (which is referred to as a separation angle).

In the specification, the separation condition will be described using the separation width and the separation angle. The separation width is defined as a distance between the ordinary ray and the extraordinary ray, and the separation angle is defined as an angle formed between a line connecting the extraordinary ray and the ordinary ray on the X-Y plane, and the horizontal direction X. The positive value of the separation angle represents the clockwise rotation, and the negative value represents the counterclockwise rotation.

Thus, according to this definition, the first birefringent plate 4 is defined as a plate whose separation width is d1 and the separation angle is +45°.

The second birefringent plate 5 is a plate whose separation width is d2, and the separation angle is −45°. The third birefringent plate 6 is a plate whose separation width is d3, and the separation angle is 0°.

As shown in FIG. 2A, if a ray, whose vertically polarized component and the horizontally polarized components are different, is incident on the LPF 10, the first birefringent plate 4 separates the ray into an ordinary ray L1 and the extraordinary ray L2. The ordinary ray L1 is polarized in a direction perpendicular to the separation angle of 45° (i.e., −45°), as indicated by arrow. The extraordinary ray L2 is polarized in a direction parallel to the separation angle (i.e., +45°).

Since the first birefringent plate 4 separates the incident ray to a ray oscillating (i.e., polarized) only in −45° direction and another ray oscillating (i.e., polarized) only in +45° direction, each of which are center of the horizontal and vertical directions, the energies of the separate rays L1 and L2 are the same even if the incident ray does not have the same energies in the horizontal and vertical directions. The rays L1 and L2, which have the same energies, are incident on the second birefringent plate 5.

As described above, the second birefringent plate 5 is a plate whose separation width is d2, and the separation angle is −45°. Since the ray L2 is polarized in +45° direction, and the separation angle of the second birefringent plate 5 is −45°, only an ordinary ray L3 is emerged from the second birefringent plate 5. The ordinary ray L3 is linearly polarized in +45° direction. The extraordinary ray, which would be separated in −45° directions, has no energy since the ray L2 does not have a component oscillating in −45° directions. Therefore, no extraordinary ray is generated by the second birefringent plate 5 from the ray L2.

The ray L1 is linearly polarized in −45° direction. Accordingly, the ordinary ray, which would be separated from the ray L1 by the second birefringent plate 5, has no energy, and therefore no ordinary ray is generated from the ray L1. While, an extraordinary ray L4 is generated, which is spaced from the incident ray (i.e., ray L1) by the separation width of d2, rotated by −45° with respect to the incident ray. Thus, only the extraordinary ray L4 is emerged from the second birefringent plate 5. The ray L4 is linearly polarized in −45° direction.

As above, the rays L1 and L2 emerged from the first birefringent plate 4 are incident on the second birefringent plate 5, from which rays L3 and L4 are emerged. Since all the energy of the ray L2 is held in the ray L3, and all the energy of the ray L1 is held in the ray L4, the energies of the rays L3 and L4 are the same.

Referring to FIG. 3, the above relationship will be described in further detail.

By the first birefringent plate 4, the incident ray is separated into the ordinary ray L1 and the extraordinary ray L2. A length of a line segment L1L2, which represents a line segment connecting the ray L1 and the ray L2 on an X-Y plate, is d1, and an angle formed by the line segment L1L2 with respect to the horizontal direction is θ1. Similarly, the length of a line segment L1L4 is d2 and an angle formed by the line segment L1L4 with respect to the horizontal direction X is θ2, θ2 being θ1−90°. It should be noted that only the extraordinary ray L4 from the ray L1, and the ordinary ray L3 from the ray L2 are emerged from the second birefringent plate 5. The line segment L1L2 and the line segment L1L4 form right angles. Further, the line segment L3L4 extend in the vertical direction. The separation width δv in the vertical direction (i.e., a length of a line segment L3L4) and the separation width d1 has a relationship indicated by equation (2).

$$d1 = \delta_v \times \sin \theta_1 \quad (2)$$

where, $0° < \delta_1 < 90°$.

Further, the separation width d2 and the separation width δv has a relationship indicated by equation (3).

$$d2 = \delta_v \times \cos \theta_1 \quad (3)$$

In the first embodiment shown in FIGS. 2A–2C, since the separation angle θ1 is 45° (and the separation angle θ2 is −45°, which is θ1−90°), the separation widths d1 and d2 are calculated as follows.

$$d1 = \delta_v \times \sin 45° = \frac{1}{\sqrt{2}} \cdot \delta_v$$

$$d2 = \delta_v \times \cos 45° = \frac{1}{\sqrt{2}} \cdot \delta_v$$

The thickness of the first birefringent plate 4 is calculated by substituting thus obtained separation width d1 in formula (1). Similarly, the thickness of the second birefringent plate 5 is calculated by substituting the obtained d2 in formula (2).

The rays L3 and L4 are separated from each other, in the vertical direction Y, by a distance d3. The distance d3 is expressed by the following equation (4).

$$d3 = d1 \cos 45° + d2 \cos 45° = \delta_v \quad (4)$$

The rays L3 and L4 are emerged from the third birefringent plate 6. As shown in FIG. 2C, the ray L3, which is linearly polarized in +45° direction is separated into an ordinary ray L5 and an extraordinary ray L6. The ray L5 is linearly polarized in 90° direction (i.e. in the vertical direction Y), and the ray L6 is linearly polarized in 0° direction (i.e., in the horizontal direction X). Similarly, the ray L4, which is linearly polarized in −45° direction is separated into an ordinary ray L7 and an extraordinary ray L8. The ray L7 is linearly polarized in 90° direction (i.e., in the vertical direction Y), and the ray L8 is linearly polarized in 0° direction (i.e., in the horizontal direction). The rays L5 and L6 are apart from each other by the separation distance of δh. Similarly, the rays L7 and L8 are apart from each other by the separation distance of δh.

The thickness of the third birefringent plate 6 can be calculated by substituting the separation distance δh for the distance d in equation (1).

Since the polarized direction of the ray L3 is the center of the polarized directions of the rays L5 and L6, the energy of the ray L3 is evenly distributed to the rays L5 and L6. Similarly, the energy of the ray L4 is evenly distributed to the rays L7 and L8. Therefore, all the rays L5, L6, L7 and L8, which are incident on the four adjacent pixels, respectively, have the same energy. Accordingly, the high frequency components of the optical image can be evenly removed regardless of the directions.

The energy of each ray will be described in further detail.

Assuming that the ray incident on the LPF 10 has a horizontally polarized component whose energy is α, and a vertically polarized component whose energy is β, the energies E1, E2, Ea, Eb, Ec and Ed of the rays L3, L4, L5, L6, L7 and L8 are expressed as follows.

$$E1 = \alpha \cdot \cos^2\theta + \beta \cdot \sin^2\theta = \frac{(\alpha + \beta)}{2}$$

$$E2 = \alpha \cdot \cos^2\theta + \beta \cdot \sin^2\theta = \frac{(\alpha + \beta)}{2}$$

$$Ea = E1 \cdot \sin^2\theta = \frac{(\alpha + \beta)}{4}$$

$$Eb = E1 \cdot \cos^2\theta = \frac{(\alpha + \beta)}{4}$$

-continued $$Ec = E2 \cdot \cos^2\theta = \frac{(\alpha+\beta)}{4}$$

$$Ed = E2 \cdot \sin^2\theta = \frac{(\alpha+\beta)}{4}$$

As above, the energies Ea-Ed of the separated rays L5–L8 are the same.

The photographing optical system 100 will now be described in further detail.

The light from the object is incident on the beam splitter 40 through the imaging lens group 30. The beam splitter 40 is configured, for example, to have a half mirror 41 which allows approximately 70–80% of the incident light to pass therethrough, and reflects the remainder (i.e., approximately 20–30% of the incident light). The light passed through the beam splitter 40 is directed toward the CCD 20, and the light reflected by the beam splitter 40 is directed to the finder optical system.

Generally, the light passed through the beam splitter is polarized, i.e., the energy in the vertical direction and the energy in the horizontal direction are different. The light passes through the LPF 10, where the high frequency components are removed as described above, and then incident on the infrared cut filter 50. It should be noted that the infrared cut filter is provided since the CCD 20 is sensitive to the infrared light and accordingly the infrared component included in the light from the object may deteriorate the quality of the captured image.

Since the high frequency components can be removed effectively as described above, an image can be captured without being affected by the moiré and/or false color phenomenon.

In the above-described embodiment, the LPF 10 is configured such that the separation angle and the separation width of the first birefringent plate 4 are +45° and d1, the separation angle and the separation width of the second birefringent plate 5 are −45° and d2, and the separation angle and the separation width of the third birefringent plate 6 are 0° and δh. The present invention is not limited to such a configuration, and various modification can be realized without departing from the gist of the invention.

FIGS. 4A–4C show first through third birefringent plates of the LPF according to a first modification of the above-described embodiment. In this modification, the horizontal and vertical pitches of the pixels are similar to those in the above-described embodiment. In the first modification, the separation angle and the separation width of the first birefringent plate are θ1 and d4, the separation angle and the separation width of the second birefringent plate are θ1+90° and d5. In this modification, θ1 is smaller than 0° and greater than −90°. Further, the separation angle and the separation width of the third birefringent plate are 0° and δh. In a specific example shown in FIGS. 4A–4C, θ1 is −45°. In this modification, the separation widths d4 and d5 are expressed by equations (5) and (6).

$$d4=|\delta_v \times \sin\theta_1| \quad (5)$$

$$d5=\delta_v \times \cos\theta_1 \quad (6)$$

where, −90°<θ1<0°.

Figure 5A:
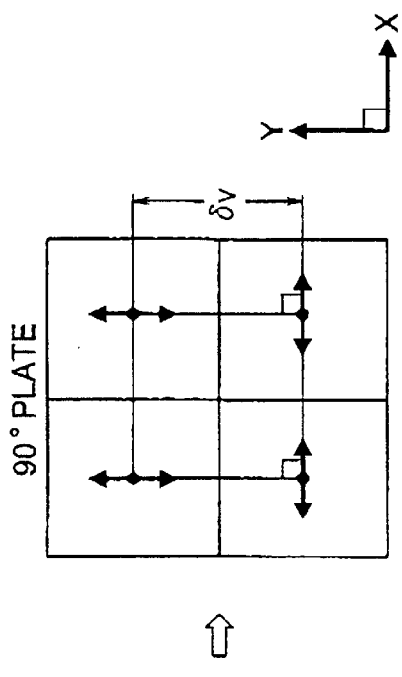
FIGS. 5A–5C show separation of rays using the LPF according to a second modification.
Figure 5B:
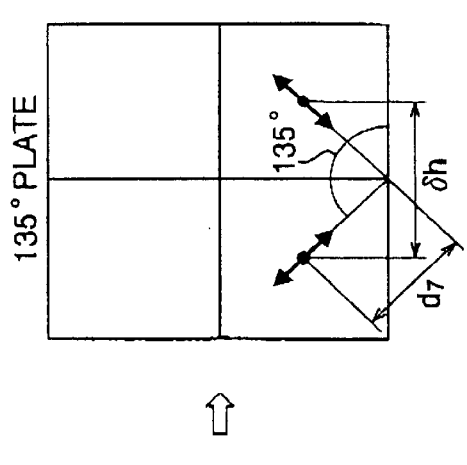
Figure 5C:
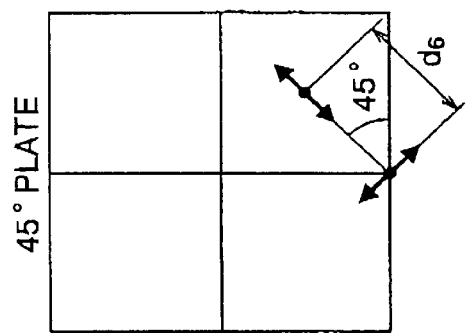

FIGS. 5A–5C show first through third birefringent plates of the LPF according to a second modification of the above-described embodiment. In this modification, the horizontal and vertical pitches of the pixels are similar to those in the above-described embodiment. In the second modification, the separation angle and the separation width of the first birefringent plate are θ1 and d6, the separation angle and the separation width of the second birefringent plate are θ1+90° and d7. In this modification, θ1 is greater than 0° and smaller than 90°. Further, the separation angle and the separation width of the third birefringent plate are 90° and δv. In a specific example shown in FIGS. 5A–5C, θ1 is +45°. In this modification, the separation widths d6 and d7 are expressed by equations (7) and (8).

$$d6=\delta_h \times \cos\theta_1 \quad (7)$$

$$d7=\delta_h \times \sin\theta_1 \quad (8)$$

where, 0°<θ1<90°.

Figure 6A:
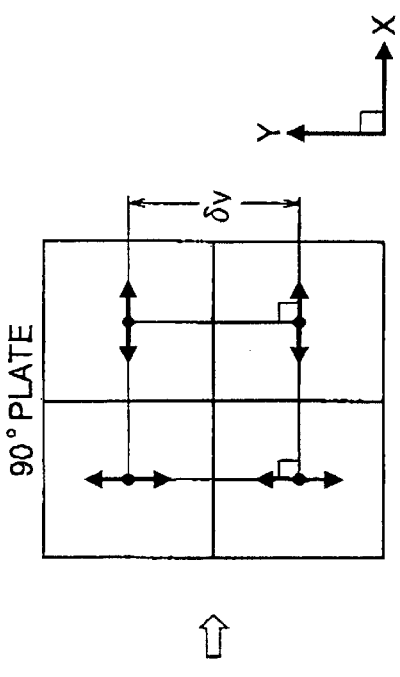
FIGS. 6A–6C show separation of rays using the LPF according to a third modification.
Figure 6B:
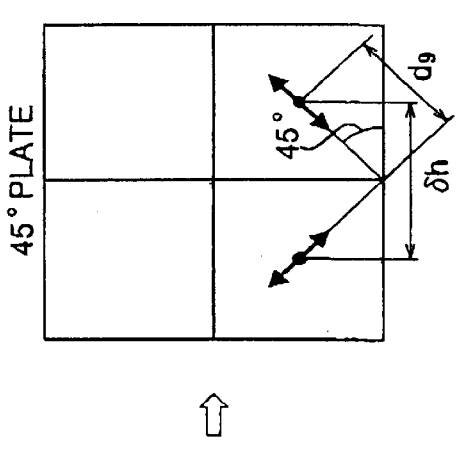
Figure 6C:
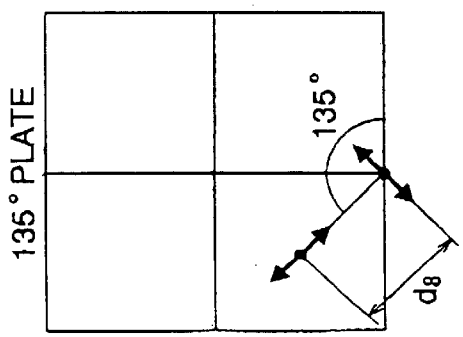

FIGS. 6A–6C show first through third birefringent plates of the LPF according to a third modification of the above-described embodiment. In this modification, the horizontal and vertical pitches of the pixels are similar to those in the above-described embodiment. In the third modification, the separation angle and the separation width of the first birefringent plate are θ1 and d8, the separation angle and the separation width of the second birefringent plate are θ1−90° and d9. In this modification, θ1 is greater than 90° and smaller than 180°. Further, the separation angle and the separation width of the third birefringent plate are 90° and δv. In a specific example shown in FIGS. 6A–6C, θ1 is 135°. In this modification, the separation widths d8 and d9 are expressed by equations (9) and (10).

$$d8=|\delta_h \times \cos\theta_1| \quad (9)$$

$$d9=\delta_h \times \sin\theta_1 \quad (10)$$

where, 90°<θ1<180°.

It should be noted that, in practice, the separation angles and separation widths described above may include certain allowance as far as the LPF functions.

Figure 7:
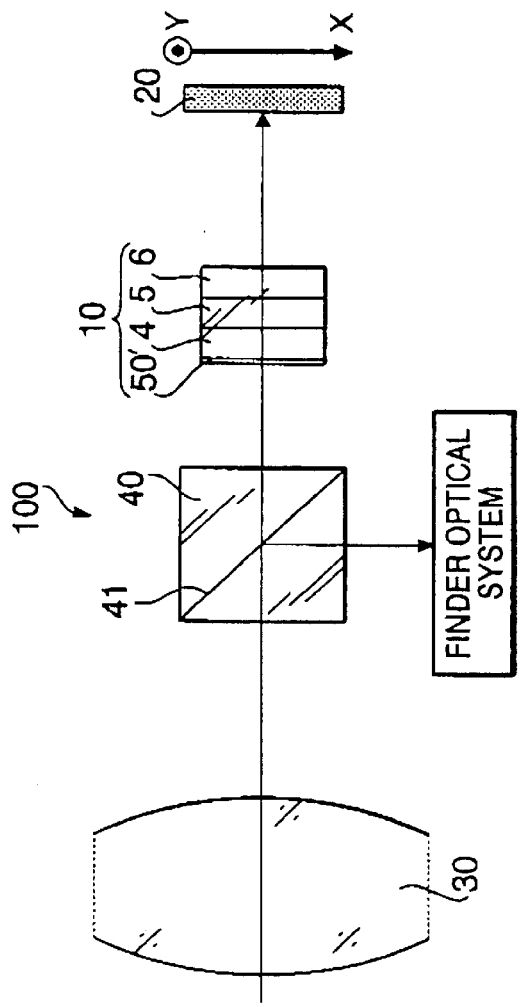
FIG. 7 shows an arrangement of the optical elements according to a second embodiment of the invention.
Figure 8:
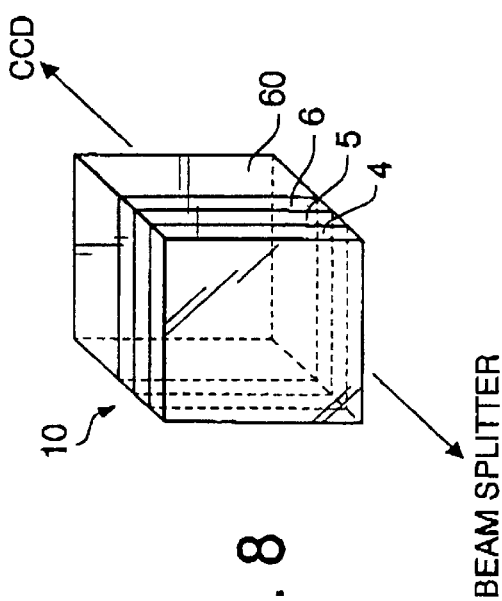
FIG. 8 is a modification of the LPF.

FIG. 7 shows an imaging optical system according to a second embodiment. The imaging optical system 200 is similar to the imaging optical system 100 except that the infrared cut filter 50 is omitted and an infrared cut coating 50' is formed on the LPF 10. In FIG. 8, the infrared cut coating 50' is formed on the object side surface of the first birefringent plate 4. Alternatively, the coating may be formed on the CCD side surface of the third birefringent plate 6, or both of the surfaces of the first and third birefringent plates 4 and 6.

FIG. 8 shows a further modification of the LPF. If the number of the pixels of the CCD is large, the separation widths should be made smaller, and therefore, the thickness of the first through third birefringent plates should be smaller. Therefore, if the LPF consists of the three birefringent plates, the thickness of the LPF as a whole varies depending on the number of the pixels, or pitches of the pixels of the CCD. If a dummy glass (i.e., a parallel plate) 60 is attached to the first through third birefringent plates 4, 5 and 6, as shown in FIG. 8, by adjusting the thickness of the dummy glass 60, the thickness of the LPF as a whole can be made constant regardless of the thickness of each birefringent plate.

The present disclosure relates to the subject matter contained in Japanese Patent Application No. 2000-021039, filed on Jan. 31, 2000, which is expressly incorporated herein by reference in its entirety.

What is claimed is:

1. An optical low-pass filter used in association with an imaging element which has a plurality of pixels arranged in vertical and horizontal direction with regularity, a separation width of said low-pass filter in the vertical direction being δv, separation width of said low-pass filter in the horizontal direction being δh, said low-pass filter comprising:

a first birefringent plate that separates an incident ray into an ordinary ray and an extraordinary ray polarized in directions perpendicular to each other, at a separation angle of θ, θ being greater than 0° and less than 90°, with respect to the horizontal direction, and a separation width of δv×sin θ;

a second birefringent plate that separates an incident ray into an ordinary ray and an extraordinary ray polarized in directions perpendicular to each other at a separation angle of (θ−90°) with respect to the horizontal direction, and a separation width of δv×cos θ; and a third birefringent plate that separates an incident ray into an ordinary ray and an extraordinary ray polarized in directions perpendicular to each other at a separation angle 0° with respect to the horizontal direction and a separation width of δh, said first, second and third birefringent plates are arranged in this order from a light incident side, and are configured to separate an incident ray into a plurality of rays having substantially a same energy level even if the incident ray is polarized, whereby high spatial frequency components of the optical image can be removed.

2. The optical low-pass filter according to claim 1, wherein said separation angle θ is substantially 45 degrees.

3. The optical low-pass filter according to claim 1, wherein the ray incident on said first birefringent plate has different energies in the horizontal direction and in the vertical direction.

4. The optical low-pass filter according to claim 1, wherein said first, second and third birefringent plates are integrally formed.

5. The optical low-pass filter according to claim 4, wherein at least one of a light incident surface of said first birefringent plate and a light emerging surface of said third birefringent plate is formed with an infrared cut coating.

6. The optical low-pass filter according to claim 3, wherein a dummy glass element is integrally formed with said integrally formed first, second and third birefringent plates.

7. The optical low-pass filter according to claim 6, wherein a thickness of said dummy glass element being adjusted so that said optical low-pass filter has a predetermined thickness regardless of the thickness of each of said first, second and third birefringent plates.

8. The optical low-pass filter according to claim 1, wherein said separation widths δh and δv are substantially the same.

9. The optical low-pass filter according to claim 1, said optical low-pass filter being configured such that when a ray having different vertically and horizontally polarized components is incident thereon, the first birefringent plate separates the incident ray into an ordinary ray polarized in a direction perpendicular to the separation angle and an extraordinary ray polarized in a direction parallel to the separation angle, the extraordinary ray emitted from the first birefringent plate generating a linearly polarized ordinary ray in passing through the second birefringent plate and the ordinary ray emitted from the first birefringent plate generating a linearly polarized extraordinary ray in passing through the second birefringent plate, the ordinary ray emitted from the second birefringent plate being separated into an ordinary ray and an extraordinary ray by the third birefringent plate and the extraordinary ray emitted from the second birefringent plate being separated into an ordinary and extraordinary ray by the third birefringent plate, the rays emitted from the third birefringent plate having substantially the same energy.

10. An optical low-pass filter used in association with an imaging element which has a plurality of pixels arranged in vertical and horizontal direction with regularity, a separation width of said low-pass filter in the vertical direction being δv, separation width of said low-pass filter in the horizontal direction being δh, said low-pass filter comprising:

a first birefringent plate that separates an incident ray into an ordinary ray and an extraordinary ray polarized in directions perpendicular to each other, at a separation angle of θ, θ being greater than −90° and less than 0°, with respect to the horizontal direction, and a separation width of |δb×sin ↓|;

a second birefringent plate that separates an incident ray into an ordinary ray and an extraordinary ray polarized in directions perpendicular to each other at a separation angle of θ+90° with respect to the horizontal direction, and a separation width of δv×cos θ; and a third birefringent plate that separates an incident ray into an ordinary ray and an extraordinary ray polarized in directions perpendicular to each other at a separation angle 0° with respect to the horizontal direction and a separation width of δh, said first, second and third birefringent plates are arranged in this order from a light incident side, and are configured to separate an incident ray into a plurality of rays having substantially a same energy level even if the incident ray is polarized, whereby high spatial frequency components of the optical image can be removed.

11. The optical low-pass filter according to claim 10, wherein said separation angle θ is substantially −45 degrees.

12. The optical low-pass filter according to claim 10, wherein the ray incident on said first birefringent plate has different energies in the horizontal direction and in the vertical direction.

13. The optical low-pass filter according to claim 10, wherein said first, second and third birefringent plates are integrally formed.

14. The optical low-pass filter according to claim 10, wherein said separation widths δh and δv are substantially the same.

15. The optical low-pass filter according to claim 13, wherein at least one of a light incident surface of said first birefringent plate and a light emerging surface of said third birefringent plate is formed with an infrared cut coating.

16. The optical low-pass filter according to claim 12, wherein a dummy glass element is integrally formed with said integrally formed first, second and third birefringent plates.

17. The optical low-pass filter according to claim wherein a thickness of said dummy glass element being adjusted so that said optical low-pass filter has a predetermined thickness regardless of the thickness of each of said first, second and third birefringent plates.

18. The optical low-pass filter according to claim 10, said optical low-pass filter being configured such that when a ray having different vertically and horizontally polarized components is incident thereon, the first birefringent plate separates the incident ray into an ordinary ray polarized in a direction perpendicular to the separation angle and an extraordinary ray polarized in a direction parallel to the separation angle, the extraordinary ray emitted from the first birefringent plate generating a linearly polarized ordinary ray in passing through the second birefringent plate and the ordinary ray emitted from the first birefringent plate generating a linearly polarized extraordinary ray in passing through the second birefringent plate, the ordinary ray emitted from the second birefringent plate being separated into an ordinary ray and an extraordinary ray by the third birefringent plate and the extraordinary ray emitted from the second birefringent plate being separated into an ordinary and extraordinary ray by the third birefringent plate, the rays emitted from the third birefringent plate having substantially the same energy.

19. An optical low-pass filter used in association with an imaging element which has a plurality of pixels arranged in vertical and horizontal direction with regularity, a separation width of said low-pass filter in the vertical direction being δv, separation width of said low-pass filter in the horizontal direction being δh, said low-pass filter comprising:

a first birefringent plate that separates an incident ray into an ordinary ray and an extraordinary ray polarized in directions perpendicular to each other, at a separation angle of θ, θ being greater than 0° and less than 90°, with respect to the horizontal direction, and a separation width of δh×cos θ;

a second birefringent plate that separates an incident ray into an ordinary ray and an extraordinary ray polarized in directions perpendicular to each other at a separation angle of (θ+90°) with respect to the horizontal direction, and a separation width of δh×sin θ; and a third birefringent plate that separates an incident ray into an ordinary ray and an extraordinary ray polarized in directions perpendicular to each other at a separation angle 90° with respect to the horizontal direction and a separation width of δv, said first, second and third birefringent plates are arranged in this order from a light incident side, and are configured to separate an incident ray into a plurality of rays having substantially a same energy level even if the incident ray is polarized, whereby high spatial frequency components of the optical image can be removed.

20. The optical low-pass filter according to claim 19, wherein said separation angle θ is substantially 45 degrees.

21. The optical low-pass filter according to claim 19, wherein the ray incident on said first birefringent plate has different energies in the horizontal direction and in the vertical direction.

22. The optical low-pass filter according to claim 19, wherein said first, second and third birefringent plates are integrally formed.

23. The optical low-pass filter according to claim 19 wherein said separation widths δh and δv are substantially the same.

24. The optical low-pass filter according to claim 22, wherein at least one of a light incident surface of said first birefringent plate and a light emerging surface of said third birefringent plate is formed with an infrared cut coating.

25. The optical low-pass filter according to claim 21, wherein a dummy glass element is integrally formed with said integrally formed first, second and third birefringent plates.

26. The optical low-pass filter according to claim 25, wherein a thickness of said dummy glass element being adjusted so that said optical low-pass filter has a predetermined thickness regardless of the thickness of each of said first, second and third birefringent plates.

27. The optical low-pass filter according to claim 19, said optical low-pass filter being configured such that when a ray having different vertically and horizontally polarized components is incident thereon, the first birefringent plate separates the incident ray into an ordinary ray polarized in a direction perpendicular to the separation angle and an extraordinary ray polarized in a direction parallel to the separation angle, the extraordinary ray emitted from the first birefringent plate generating a linearly polarized ordinary ray in passing through the second birefringent plate and the ordinary ray emitted from the first birefringent plate generating a linearly polarized extraordinary ray in passing through the second birefringent plate, the ordinary ray emitted from the second birefringent plate being separated into an ordinary ray and an extraordinary ray by the third birefringent plate and the extraordinary ray emitted from the second birefringent plate being separated into an ordinary and extraordinary ray by the third birefringent plate, the rays emitted from the third birefringent plate having substantially the same energy.

28. An optical low-pass filter used in association with an imaging element which has a plurality of pixels arranged in vertical and horizontal direction with regularity, a separation width of said low-pass filter in the vertical direction being δv, separation width of said low-pass filter in the horizontal direction being δh, said low-pass filter comprising:

a first birefringent plate that separates an incident ray into an ordinary ray and an extraordinary ray polarized in directions perpendicular to each other, at a separation angle of θ, θ being greater than 90° and less than 180°, with respect to the horizontal direction, and a separation width of |δh×cos θ|;

a second birefringent plate that separates an incident ray into an ordinary ray and an extraordinary ray polarized in directions perpendicular to each other at a separation angle of θ−90° with respect to the horizontal direction, and a separation width of δh×sin θ; and a third birefringent plate that separates an incident ray into an ordinary ray and an extraordinary ray polarized in directions perpendicular to each other at a separation angle 90° with respect to the horizontal direction and a separation width of δv, said first, second and third birefringent plates are arranged in this order from a light incident side, and are configured to separate an incident ray into a plurality of rays having substantially a same energy level even if the incident ray is polarized, whereby high spatial frequency components of the optical image can be removed.

29. The optical low-pass filter according to claim 28, wherein said separation angle θ is substantially 135 degrees.

30. The optical low-pass filter according to claim 28, wherein the ray incident on said first birefringent plate has different energies in the horizontal direction and in the vertical direction.

31. The optical low-pass filter according to claim 28, wherein said first, second and third birefringent plates are integrally formed.

32. The optical low-pass filter according to claim 31, wherein at least one of a light incident surface of said first birefringent plate and a light emerging surface of said third birefringent plate is formed with an infrared cut coating.

33. The optical low-pass filter according to claim 30, wherein a dummy glass element is integrally formed with said integrally formed first, second and third birefringent plates.

34. The optical low-pass filter according to claim 33, wherein a thickness of said dummy glass element being adjusted so that said optical low-pass filter has a predetermined thickness regardless of the thickness of each of said first, second and third birefringent plates.

35. The optical low-pass filter according to claim 29, wherein said separation widths δh and δv are substantially the same.

36. The optical low-pass filter according to claim 28, said optical low-pass filter being configured such that when a ray having different vertically and horizontally polarized components is incident thereon, the first birefringent plate separates the incident ray into an ordinary ray polarized in a direction perpendicular to the separation angle and an extraordinary ray polarized in a direction parallel to the separation angle, the extraordinary ray emitted from the first birefringent plate generating a linearly polarized ordinary ray in passing through the second birefringent plate and the ordinary ray emitted from the first birefringent plate generating a linearly polarized extraordinary ray in passing through the second birefringent plate, the ordinary ray emitted from the second birefringent plate being separated into an ordinary ray and an extraordinary ray by the third birefringent plate and the extraordinary ray emitted from the second birefringent plate being separated into an ordinary and extraordinary ray by the third birefringent plate, the rays emitted from the third birefringent plate having substantially the same energy.

* * * * *